(12) United States Patent
Grelier et al.

(10) Patent No.: US 9,274,227 B2
(45) Date of Patent: Mar. 1, 2016

(54) GNSS RADIO SIGNAL WITH AN IMPROVED NAVIGATION MESSAGE

(71) Applicant: Centre National D'Etudes Spatiales, Paris (FR)

(72) Inventors: Thomas Grelier, Toulouse (FR); Lionel Ries, Viviers les Montagnes (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 0 days.

(21) Appl. No.: 14/412,787

(22) PCT Filed: Jul. 9, 2013

(86) PCT No.: PCT/EP2013/064477
§ 371 (c)(1),
(2) Date: Jan. 5, 2015

(87) PCT Pub. No.: WO2014/009365
PCT Pub. Date: Jan. 16, 2014

(65) Prior Publication Data
US 2015/0168558 A1    Jun. 18, 2015

(30) Foreign Application Priority Data
Jul. 11, 2012    (FR) ..................... 12 56694

(51) Int. Cl.
*G01S 19/13* (2010.01)
*G01S 19/02* (2010.01)

(52) U.S. Cl.
CPC *G01S 19/13* (2013.01); *G01S 19/02* (2013.01)

(58) Field of Classification Search
CPC .......... G01S 19/09; G01S 19/13; G01S 19/42
USPC .............. 342/357.2, 357.21, 357.25, 357.46, 342/357.51; 701/468, 478
See application file for complete search history.

(56) References Cited

U.S. PATENT DOCUMENTS
2010/0007554 A1    1/2010  Wang et al.

OTHER PUBLICATIONS

Betz, John W. et al.; "L1C Signal Design Options"; ION NTM; Jan. 18-20, 2006; pp. 686-697.
Stansell, Thomas A. et al.; "GPS L1C: Enhanced Performance, Receiver Design Suggestions, and Key Contributions"; 23rd International Technical Meeting of the Satellite Division of The Institute of Navigation; Sep. 21-24, 2010; pp. 2860-2873.
(Continued)

*Primary Examiner* — Dao Phan
(74) *Attorney, Agent, or Firm* — Pearne & Gordon LLP

(57) ABSTRACT

A global navigation satellite system ("GNSS") positioning method is provided, based upon a GNSS radio signal that includes a navigation message transmitted as a sequence of frames, each frame being composed of a plurality of subframes, each of which contains a first set of ephemeris and clock correction data (DECH) sufficient for computing a satellite position and a satellite clock error. Each subframe furthermore contains a second set of DECH, more compact than the first set of DECH, but sufficient for computing satellite position and satellite clock error to a lesser degree of accuracy, at least two copies of the second set of DECH being present in each subframe, such that the timing difference between two consecutive copies does not exceed 70% of the subframe duration.

14 Claims, 2 Drawing Sheets

(56) References Cited

OTHER PUBLICATIONS

Paonni, Matteo et al.; "Quasi-Pilot Signals: Improving Sensitivity and TTFF without Compromises"; 23rd International Technical Meeting of the Satellite Division of the Institute of Navigation; Sep. 19-23, 2011; pp. 1254-1263.

"European GNSS (Galileo) Open Service—Signal in Space Interface Control Documnet"; OD SIS ICD, Issue 1.1; Sep. 2010; pp. 1-206.
International Search Report from Corresponding PCT Application No. PCT/EP2013/064477; Dated Oct. 15, 2013.
International Preliminary Report on Patentability of Corresponding Application No. PCT/EP2013/064477, English Translation; Dated Mar. 6, 2015.

GNSS RADIO SIGNAL WITH AN IMPROVED NAVIGATION MESSAGE

FIELD OF THE INVENTION

The present invention concerns the technological field of satellite radionavigation. The invention is concerned with a global navigation satellite system ("GNSS") positioning method that is based upon the radionavigation signals transmitted by satellites (hereafter "GNSS radio signals" or "GNSS signals"), in particular with the navigation message communicated by these signals to the user receivers in order to enable or facilitate geopositioning by said receivers.

BACKGROUND OF THE INVENTION

GNSS signals (the "Signal-in-Space" segment) are the main interface between a GNSS ("Global Navigation Satellite System") spatial infrastructure and the various user segments thereof. In this respect, it plays a major part in the performance which will be available to a user in a given environment and use context. This is because performance is the result of the receiving algorithms used (a function of the use context) and of the quality of the signal which reaches the user (affected by propagation conditions).

The spectral and temporal characteristics of the signal, such as carrier frequency, power or modulation (PRN, BPSK, BOC rate) parameters, substantially determine performance in terms of interoperability, tracking and interference and multipath robustness, etc.

The navigation message itself is also a predominant factor in performance. It determines the services in terms of content, but also, by means of its structure, in terms of availability (robustness) and latency (or responsiveness). The navigation message contains, inter alia, a set of ephemeris and clock correction data ("DECH") from the transmitting satellite. The set of DECH is taken to mean a set of data sufficient to permit the receiver to compute the satellite position and the satellite clock error. The navigation message makes a significant contribution to acquisition performance, in particular to acquisition time (also known as "Time To First Fix").

However, the design of a GNSS signal and its navigation message are also the result of a compromise between the various intended service requirements and content (for example and for Galileo: Open Service (OS), Safety of Life (SoL), Search And Rescue Return Link Message (SAR RLM), etc.), sometimes conflicting performance objectives (responsiveness and robustness), and operational or technological constraints (interoperability, mass/consumption/volume of the satellites, etc.).

The Galileo E1 OS and GPS L1C signals thus incorporate numerous changes in comparison with the GPS C/A signal: new navigation message structure, PRN code, optimized modulation schemes, etc. Both signals are directed inter alia towards open service, essentially intended for consumer receivers, and often operate in a difficult environment (urban canyon, for example). However, these two signals differ significantly in their design: the L1C GPS signal is solely directed towards open service, whereas the Galileo OS signal was designed both to handle open service and to supply real-time integrity data (SoL) and the SAR return link channel (SAR RLM). As a consequence, the Galileo message does not solely contain items of ephemeris and time (clock correction) data, but also additional items of data.

SUMMARY OF THE INVENTION

It is an object of the present invention to improve the navigation message in terms of permitting a reduction in acquisition time in a receiver which has no prior items of ephemeris and clock data available, for example because it is not assisted or is partially assisted.

GENERAL DESCRIPTION OF THE INVENTION

According to the invention, a global navigation satellite system ("GNSS") positioning method is based upon a GNSS radio signal that comprises a navigation message transmitted as a sequence of frames, each frame being composed of a plurality of subframes, each of which contains a first set of ephemeris and clock correction data (DECH) sufficient for computing a satellite position and a satellite clock error. Each subframe furthermore contains a second set of DECH, more compact (i.e. smaller in size) than the first set of DECH, but sufficient for computing said satellite position and satellite clock error to a lesser degree of accuracy (by comparison with the computation made possible by the first set of DECH), at least two copies of the second set of DECH being present in each subframe, such that the timing difference between two consecutive copies does not exceed 70% of the subframe duration.

While existing or planned navigation messages contain a single set of DECH per subframe, the invention proposes a navigation message in which each subframe contains at least two copies of a less bulky second set of DECH. Given that the timing difference between two consecutive copies of the second set of DECH does not exceed 70% of the subframe duration, the maximum waiting time (in the worst case, assuming successful decoding of the navigation message) for collecting a complete set of DECH is made substantially shorter than the subframe duration. As a result, a receiver operating in unassisted mode will, for example, be capable of more rapidly locating the satellites which it is monitoring and therefore of determining its position. It will be noted that it will only be possible to locate the satellites with a lesser degree of accuracy (for example with an uncertainty of around one hundred meters instead of an uncertainty of a few meters). Geopositioning based on such satellite location will therefore be affected by a higher level of uncertainty. This increased uncertainty will, however, only be transient given that the first set of DECH will be available, in the worst case (assuming successful decoding of the navigation message), once a period of time roughly equal to the subframe duration has elapsed, if permitted by the receiving and signal to noise ratio conditions. It will be understood that a user will perceive the mean waiting time (after starting up the receiver) to be greatly reduced.

It will be noted that the second set of DECH is broadcast in addition to the first set of DECH via the same transmission channel (the navigation message). The receiver can thus reduce its acquisition time from cold without needing to receive assistance data via another canal (A-GNSS).

Preferably, the timing difference between two consecutive copies of the second set of DECH does not exceed 60% of the subframe duration.

According to a preferred embodiment of the invention, each subframe is subdivided into pages, each page containing a data word. The first set of DECH is spread over a plurality of words within each subframe, whereas each copy of the second set of DECH is present in a single word within each subframe. Preferably, the pages containing the at least two copies of the second set of DECH are spread in the subframes at substantially equal spacings.

The format of the second set of ephemeris data may be static, i.e. invariable over time. Alternatively, the format may be modified dynamically while the navigation message is being sent. In this case, the receivers must be informed via some communication channel of the current format. For example, the format of the second set of DECH could be selected from a plurality of predefined formats, the navigation message comprising an indicator of the selected format. The navigation message could also specify the format of the second set of DECH (which is particularly useful if the format is determined freely according to current system requirements).

Preferably, this second set of DECH represents at least six orbital parameters, the reference time, the satellite clock bias together with the satellite clock drift. In this case, the second set of DECH corresponds to the most essential parameters of the first set of DECH, optionally with another quantization. Alternatively, the second set of DECH may take the form of a set of parameters of a mathematical model describing a satellite orbit and a clock error which differs from the mathematical model on which the first set of ephemeris and clock correction data is based.

One aspect of the invention concerns a GNSS positioning method. The method comprises (a) receiving a plurality of GNSS radio signals as described above, said receiving including at least determination of pseudo-distances and monitoring of the navigation messages of the GNSS signals, (b) computing satellite positions and satellite clock errors on the basis of the second set of DECH of each monitored navigation message; and (c) determining a user position on the basis of the determined pseudo-distances and the computed satellite positions and satellite clock errors. The method preferably also comprises recording the first set of DECH and recomputing the satellite positions and satellite clock errors on the basis of the first set of DECH as soon as the latter is available. A user position may then be redetermined on the basis of the more accurate ephemeris and clock data.

Another aspect of the invention concerns a GNSS receiver comprising memory means containing a computer program with instructions causing the GNSS receiver to carry out the method described above when the computer program is run by the GNSS receiver.

Finally, an aspect of the invention concerns a computer program comprising instructions causing a GNSS receiver to carry out the method described above when the computer program is run by the GNSS receiver.

BRIEF DESCRIPTION OF THE DRAWINGS

Other distinctive features and characteristics of the invention will emerge from the detailed description of some advantageous embodiments given below by way of illustration with reference to the appended drawings, in which.

DESCRIPTION OF A PREFERRED EMBODIMENT

The embodiment of the invention discussed below is based on the I/NAV navigation message transmitted on the E1-B component (data channel of the E1 OS signal) of the Galileo navigation system, which said embodiment proposes to modify. It should, however, be noted that this choice has been made purely for the purposes of illustrating the invention, which can also be carried out on other GNSS signals (from Galileo, GPS, Glonass, Compass etc. or regional systems). Further information about the I/NAV message may be obtained by consulting the document "European GNSS (Galileo) Open Service Signal in Space Interface Control Document" (hereafter Galileo OS SIS ICD), version 1.1, September 2010, published by the European Commission on the site: http://ec.europa.eu/enterprise/policies/satnav/galileo/open-service/indexen.htm.

Figure 1:
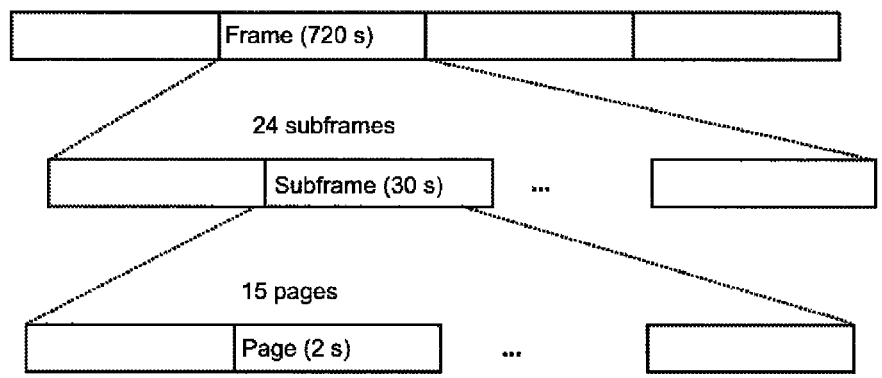
FIG. 1: is a diagram of the structure of a Galileo I/NAV radionavigation signal provided on the E1-B signal component.

The Galileo I/NAV message consists of a frame of 720 seconds, divided into 24 subframes each of 30 seconds. The latter are composed of 15 pages of 2 seconds, each page being composed of an even part and an odd part lasting 1 second. The structure of the I/NAV message is schematically illustrated in FIG. 1.

The even and odd parts of a page are composed of 120 bits of useful data, a complete page therefore containing 240 bits of useful information. These bits are encoded with a convolutional code (7, ½). The 120 bits of useful data are transformed into 240 symbols after encoding, to which a synchronization pattern of 10 symbols is added as header. Half a page therefore contains 250 symbols.

Each page contains a 128 bit data field, known as "word" and spread over the two parts of the page (divided into 16 and 112 bits respectively).

The words contain the items of information used by the navigation receiver to compute its position (ephemeris, Galileo system time, clock corrections, ionospheric corrections, almanacs, etc.).

Among these items of information, only three are necessary for establishing a first position: the ephemeris, the clock corrections and the system time information. The other parameters are supplied to provide supplemental accuracy.

Ten types of words are defined in the Galileo OS SIS ICD depending on their content (nos. 1 to 10); an eleventh type (no. 0) is reserved for "spare" (free) words, i.e. which contain no useful information. Out of the 128 bits which compose a word, the first 6 are reserved for identifying the word type. 122 bits therefore remain for useful information.

The standard ephemeris and clock correction data (DECH) are encoded over 4 words (word types 1 to 4, see Galileo SIS ICD, section 4.3.5). The standard DECH are composed of 20 parameters (16 for the ephemeris and 4 for the clock corrections). The parameters are set out in the following table:

| Parameter | Definition | Allocated bits | Word type |
|---|---|---|---|
| Ephemeris data | | | |
| $t_{oe}$ | Ephemeris reference time | 14 | 1 |
| $M_0$ | Mean anomaly at $t_{oe}$ | 32 | 1 |
| e | Eccentricity | 32 | 1 |
| $A^{1/2}$ | Square root of the semi-major axis | 32 | 1 |
| $\Omega_0$ | Longitude of ascending node | 32 | 2 |
| $i_0$ | Inclination angle of orbital plane | 32 | 2 |
| $\omega$ | Argument of perigee | 32 | 2 |
| i | Rate of inclination angle | 14 | 2 |
| $\dot{\Omega}$ | Rate of right ascension | 24 | 3 |
| $\Delta n$ | Mean motion difference from computed value | 10 | 3 |
| $C_{us}$ | Amplitude of the sine harmonic correction term to the argument of latitude | 16 | 3 |
| $C_{rc}$ | Amplitude of the cosine harmonic correction term to the orbit radius | 16 | 3 |
| $C_{rs}$ | Amplitude of the sine harmonic correction term to the orbit radius | 16 | 3 |
| $C_{ic}$ | Amplitude of the cosine harmonic correction term to the angle of | 16 | 4 |

-continued

| Parameter | Definition | Allocated bits | Word type |
|---|---|---|---|
| $C_{is}$ | inclination Amplitude of the sine harmonic correction term to the angle of inclination | 16 | 4 |
| | Clock correction data | | |
| $t_{0c}$ | Clock correction data reference time of week | 14 | 4 |
| $a_{f0}$ | Clock bias correction coefficient | 31 | 4 |
| $a_{f1}$ | Clock drift correction coefficient | 21 | 4 |
| $a_{f2}$ | Clock drift rate correction coefficient | 6 | 4 |

The standard DECH are transmitted with a periodicity of 30 seconds (i.e. at the same rate as the subframes). In total, the information is encoded over 428 bits.

The Galileo system time (GST) is composed of two parameters: the week number (WN) and the time of week (TOW). The WN is transmitted once every 30 seconds (word type 5), while the TOW is transmitted twice per subframe (word type nos. 5 and 6).

The distribution of words in the subframe of 30 seconds is as follows on E1-B (time 0 corresponding to the start of a subframe):

| $T_0$ (s) | Word type | Content |
|---|---|---|
| 0 | 2 | Ephemeris (2/4) |
| 2 | 4 | Ephemeris (4/4), clock corrections |
| 4 | 6 | Ionospheric, GST etc. corrections |
| 6 | 7 or 9 | Almanacs (1/2) |
| 8 | 8 or 10 | Almanacs (2/2) |
| 10 | Reserved | Reserved for SoL service |
| 12 | Reserved | |
| 14 | Reserved | |
| 16 | Reserved | |
| 18 | Reserved | |
| 20 | 1 | Ephemeris (1/4) |
| 22 | 3 | Ephemeris (3/4) |
| 24 | 5 | GST-UTC conversion, TOW |
| 26 | 0 (spare) | Not defined in Galileo OS SIS ICD |
| 28 | 0 (spare) | |

The set of almanacs (up to 36 satellites) is transmitted over the duration of a frame (720 seconds).

Five of the 15 words present in the subframe (located 10 to 20 s from T0) are reserved and two words (located 28 to 30 s from T0) are not defined in the Galileo ICD.

A significant proportion of the bits identified as reserved in this document are reserved with a view to the future introduction of the SoL service:
the 5 reserved words, identified in the preceding table.
the reserved fields of each odd half-page (cf. table 41 of Galileo OS SIS ICD.)

A set of bits are furthermore defined as "Spare" in Galileo OS SIS ICD:
the 2 "spare" words (cf preceding table).
the "spare" field of each odd half-page (cf. table 41 of Galileo OS SIS ICD).

In total, this proportion amounts to a total of 1646 bits out of 3600 bits broadcast every 30 seconds.

The present example according to the invention belongs to the context in which it might be possible to make use of some of the bits currently reserved for SoL in order to improve the performance of the Galileo Open Service (robustness and TTFF).

It will be noted that the standard DECH mentioned above correspond to a first set of DECH sufficient to enable a receiver to compute the position of the satellite in question and to correct the satellite's clock.

In order to obtain a GNSS signal in line with a preferred embodiment of the invention, it is proposed, for example, to modify the Galileo I/NAV message by incorporating into each subframe a second set of DECH, more compact than the standard set of DECH, but sufficient for computing the satellite position and the clock error to a lesser degree of accuracy. In particular, the second set of DECH is inserted into each subframe in two instances.

For the purposes of the example illustrated, the words at times $T_0=10$ s and $T_0=26$ s are replaced by a word of a new type each containing a copy of the second set of DECH.

The resultant frame takes the form shown in the following table:

| $T_0$ (s) | Word type | Content |
|---|---|---|
| 0 | 2 | Ephemeris (2/4) |
| 2 | 4 | Ephemeris (4/4), clock corrections |
| 4 | 6 | Ionospheric, GST etc. corrections |
| 6 | 7 or 9 | Almanacs (1/2) |
| 8 | 8 or 10 | Almanacs (2/2) |
| 10 | New | Compact DECH |
| 12 | Reserved | Reserved for SoL service |
| 14 | Reserved | |
| 16 | Reserved | |
| 18 | Reserved | |
| 20 | 1 | Ephemeris (1/4) |
| 22 | 3 | Ephemeris (3/4) |
| 24 | 5 | GST-UTC conversion, TOW |
| 26 | New | Compact DECH |
| 28 | 0 (spare) | Not defined in Galileo OS SIS ICD |

The word of the new type is equal in size to the other words and can receive as many bits of useful data (i.e. 122). If an accuracy of the compact DECH of the order of magnitude of 100 m for 95% of the time is required, it is preferable to keep only the 9 following parameters:
6 Kepler parameters
the reference time
the clock bias and clock drift.

Figure 2:
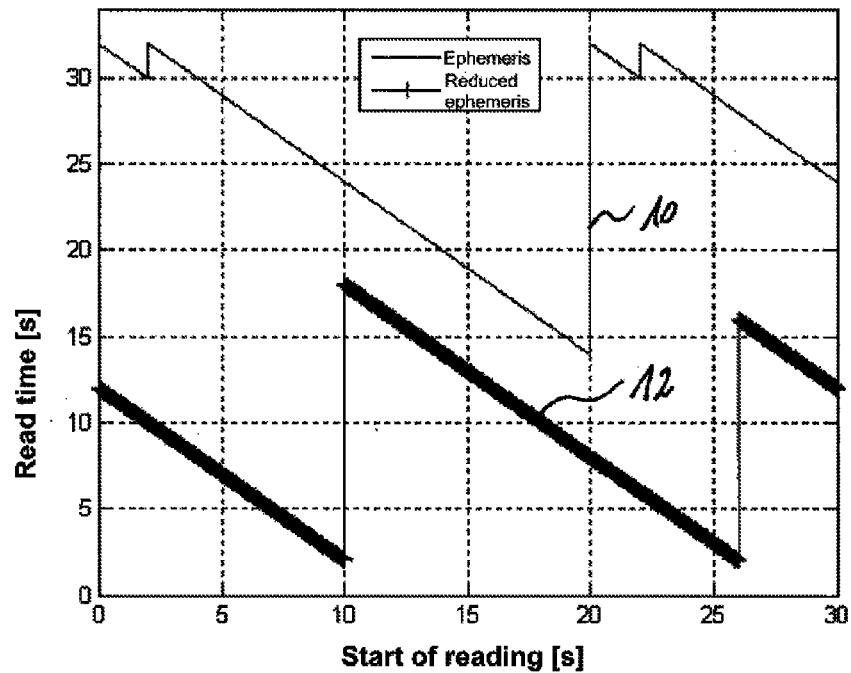
FIG. 2: is a graph illustrating the reduction in read time of the second set of DECH relative to the first set of DECH in the example discussed.

The way the distribution of the compact DECH in the I/NAV message is configured (double transmission at times $T_0=10$ s and $T_0=26$ s) makes it possible to achieve a mean read time of less than 10 s. The read time of the compact DECH depends on the initial time the message is received ($T_0$). This is plotted on FIG. 2 (assuming that the information is decoded without error and in a single pass): the curve 10 shows the read time of the (whole) set of standard DECH, while curve 12 shows the read time of the set of compact DECH as a function of reading within a subframe. It will be noted that the mean read time of the standard DECH is 25.4 s whereas the read time of the compact DECH amounts to just 9.5 s. The maximum read time of the standard DECH (assuming successful decoding) is 32 s. The corresponding value for the compact DECH amounts to 18 s. The reduction in mean and maximum read times results in a distinctly reduced first acquisition time (time to first fix). It will, however, be noted that the positioning accuracy which can be achieved with the compact DECH will be lower than the accuracy which could be obtained with the standard DECH. However, since the set of standard DECH will be available in the receiver once a complete subframe has been received (therefore at the latest after 32 s assuming decoding is successful), the lack of accuracy is transient and does not amount to a major drawback.

With regard to generating and broadcasting the compact DECH, it will be noted that these may be computed on the basis of the standard DECH (namely "nominal" DECH), as a function of the desired positioning accuracy, the quantity of bits available for broadcasting them in the navigation message and the dynamics of the standard DECH.

Figure 3:
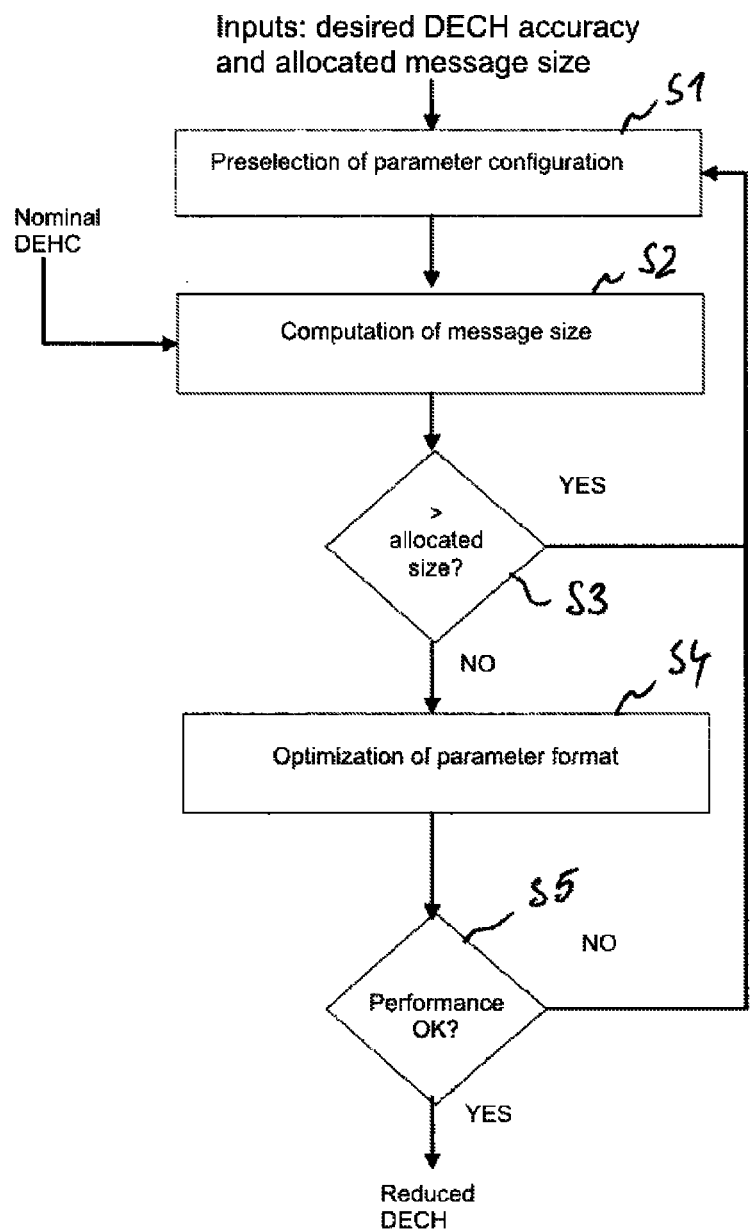
FIG. 3: is a diagram illustrating a method for determining the format of the compact DECH.

A generation method is illustrated schematically by the diagram in FIG. 3. A combination of reference parameters (characterized by their type and their quantization step) selected from a list of previously defined reference combinations and supplying an orbit and clock correction computation which in principle meet requirements (stage S1) is considered.

The range of variation in the parameters in the standard DECH is then evaluated and the number of quantization bits required is subtracted as a function of the quantization step (stage S2).

If the number of bits required is less than the number of bits available (outcome NO from stage S3), a set of parameter combinations, constructed by reducing the quantization step and/or increasing the number of parameters, while still complying with the constraint with regard to the number of bits available (stage S4), is determined. The performance of these combinations is tested and the optimum combination is determined.

If the precision obtained with this combination of parameters (type, number of bits, quantization) meets requirements (stage S5), the format of the compact DECH is fixed. The compact DECH are then computed by applying this format.

If the number of bits required is greater than the number of bits available (outcome YES from stage S3) or if the intended performance is not obtained (outcome NO from stage S5), a new combination of reference parameters is selected (return to stage 1).

The format of the set of compact DECH (type of parameters, number of quantization bits) may be static. In this case of a static format, the GNSS receivers may be configured once and for all at the time of manufacture.

EXAMPLE

| DECH parameter type | No. of bits | Quantiz. |
|---|---|---|
| $P_1$ | $B_1$ | $Q_1$ |
| $P_2$ | $B_2$ | $Q_2$ |
| ... | ... | ... |
| $P_N$ | $B_N$ | $Q_N$ |

Alternatively, a plurality of compact DECH formats may be predefined. In this case, the GNSS control segment can select the optimum format from the set of predefined formats. The GNSS receivers are then informed of the various predefined formats (by configuration at the time of manufacture, by downloading the protocol, or other means). A format identifier must be communicated to the receivers for them to be able to use the compact DECH. This may be achieved by including an identifier in the navigation message or by broadcasting the identifier via any other communication channel.

A plurality of variants of this option are conceivable. According to a first variant, the different combinations of parameters differ solely in terms of quantization step, with the types of parameters and the respective number of bits being identical.

Example: Set of 2 Combinations (2 Predefined Formats from which the Control Segment can Select)

| Combination 1 | | | Combination 2 | | |
|---|---|---|---|---|---|
| Parameter type | No. of bits | Quantiz. | Parameter type | No. of bits | Quantiz. |
| $P_1$ | $B_1$ | $Q_1$ | $P_1$ | $B_1$ | $Q'_1$ |
| $P_2$ | $B_2$ | $Q_2$ | $P_2$ | $B_2$ | $Q'_2$ |
| ... | ... | ... | ... | ... | ... |
| $P_N$ | $B_N$ | $Q_N$ | $P_N$ | $B_N$ | $Q'_N$ |

According to a second variant, no constraint is applied to the combinations of parameters (types, number of bits and quantization step may be different).

Example: 2 Combinations, the First with N Parameters, the Second with K Parameters

| Combination 1 | | | Combination 2 | | |
|---|---|---|---|---|---|
| Parameter type | No. of bits | Quantiz. | Parameter type | No. of bits | Quantiz. |
| $P_{11}$ | $B_1$ | $Q_{11}$ | $P_{12}$ | $B_{12}$ | $Q_{12}$ |
| $P_{21}$ | $B_2$ | $Q_{21}$ | $P_{22}$ | $B_{22}$ | $Q_{22}$ |
| ... | ... | ... | ... | ... | ... |
| $P_{N1}$ | $B_{N1}$ | $Q_N$ | $P_{K2}$ | $B_{K2}$ | $Q_{K2}$ |

It is also conceivable for the control segment to choose the optimum combination of DECH parameters (defined by their type, number of bits and quantization step) to broadcast, without any constraint on the format of the parameters, the latter being in this case indicated to the receiver by other means (for example either in the navigation message or via an external system).

What is claimed is:

1. A global navigation satellite system ("GNSS") positioning method, comprising the steps of:
   transmitting a GNSS radio signal comprising a navigation message that is transmitted as a sequence of frames;
   including a plurality of subframes within each frame, wherein each subframe contains a first set of ephemeris and clock correction data sufficient for computing a satellite position and a satellite clock error;
   including a second set of ephemeris and clock correction data within each subframe, more compact than the first set of ephemeris and clock correction data, but sufficient for computing said satellite position and said satellite clock error to a lesser degree of accuracy; and
   including at least two copies of the second ephemeris and clock correction data within each subframe, such that a timing difference between two consecutive copies does not exceed 70% of a subframe duration.

2. The positioning method according to claim 1, wherein the timing difference between two consecutive copies does not exceed 60% of the subframe duration.

3. The positioning method according to claim 1, wherein each subframe is subdivided into pages, each page containing a data word, wherein said first set of ephemeris and clock correction data is spread over a plurality of words within each subframe and wherein each copy of the second set of ephemeris and clock correction data is present in a single word within each subframe.

4. The positioning method according to claim 3, wherein the pages which contain the at least two copies of the second set of ephemeris and clock correction data are spread in the subframes at substantially equal spacings.

5. The positioning method according to claim 1, wherein a format of the second set of ephemeris and clock correction data is invariable over time.

6. The positioning method according to claim 1, wherein a format of the second set of ephemeris and clock correction data is selected from a plurality of predefined formats, the navigation message comprising an indicator of the selected format.

7. The positioning method according claim 1, wherein the navigation message specifies a format of the second set of ephemeris and clock correction data.

8. The positioning method according to claim 1, wherein the second set of ephemeris and clock correction data represents at least six Kepler parameters, a reference time, and a satellite clock bias together with a satellite clock drift.

9. The positioning method according to claim 1, in which the second set of ephemeris and clock correction data takes the form of a set of parameters of a mathematical model describing a satellite orbit and a clock error which differs from a mathematical model on which the first set of ephemeris and clock correction data is based.

10. A global navigation satellite system ("GNSS") positioning method, comprising the steps of:
receiving a plurality of GNSS radio signals that each contain a navigation message transmitted as a sequence of frames, each frame being composed of a plurality of subframes, each subframe containing a first set of ephemeris and clock correction data sufficient for computing a satellite position and a satellite clock error, wherein each subframe furthermore contains a second set of ephemeris and clock correction data, more compact than the first set of ephemeris and clock correction data, but sufficient for computing said satellite position and said satellite clock error to a lesser degree of accuracy, at least two copies of the second ephemeris and clock correction data being present in each subframe, such that a timing difference between two consecutive copies does not exceed 70% of the subframe duration,
wherein said receiving further includes a determination of pseudo-distances and monitoring of the navigation messages of the GNSS signals;
computing satellite positions and satellite clock errors on the basis of the second set of ephemeris and clock correction data of each monitored message; and
determining a user position on the basis of the determined pseudo-distances and the computed satellite positions and satellite clock errors.

11. The positioning method according to claim 10, wherein the steps of receiving, computing, and determining are performed on a GNSS receiver comprising memory means containing a computer program with instructions causing the GNSS receiver to carry out said receiving, computing, and determining steps when the computer program is run by the GNSS receiver.

12. The positioning method according to claim 10, wherein the steps of receiving, computing, and determining are performed by a computer program comprising instructions causing a GNSS receiver to carry out the receiving, computing, and determining steps when the computer program is run by the GNSS receiver.

13. A GNSS receiver comprising memory means containing a computer program with instructions causing the GNSS receiver to carry out the method according to claim 10 when the computer program is run by the GNSS receiver.

14. A non-transitory computer readable medium for storing a computer program comprising instructions causing a GNSS receiver to carry out the method according to claim 10 when the computer program is run by the GNSS receiver.

* * * * *